United States Patent
Satou et al.

(10) Patent No.: US 7,805,930 B2
(45) Date of Patent: Oct. 5, 2010

(54) EXHAUST EMISSION PURIFYING APPARATUS FOR ENGINE

(75) Inventors: Hirokazu Satou, Ageo (JP); Mitsuhiro Nishina, Saitama (JP)

(73) Assignee: Nissan Diesel Motor Co., Ltd., Ageo-shi, Saitama (JP)

( * ) Notice: Subject to any disclaimer, the term of this patent is extended or adjusted under 35 U.S.C. 154(b) by 649 days.

(21) Appl. No.: 11/790,739

(22) Filed: Apr. 27, 2007

(65) Prior Publication Data

US 2007/0199308 A1    Aug. 30, 2007

Related U.S. Application Data

(63) Continuation of application No. PCT/JP2005/017287, filed on Sep. 20, 2005.

(30) Foreign Application Priority Data

Oct. 29, 2004    (JP)    ............... 2004-316046

(51) Int. Cl.
*F01N 3/00* (2006.01)
(52) U.S. Cl. .............. 60/286; 60/295; 60/298; 60/301; 60/303
(58) Field of Classification Search ............. 60/286, 60/295, 300, 301, 303
See application file for complete search history.

(56) References Cited

U.S. PATENT DOCUMENTS

| | | | |
|---|---|---|---|
| 5,884,475 A * | 3/1999 | Hofmann et al. | ............. 60/274 |
| 6,063,350 A | 5/2000 | Tarabulski et al. | |
| 6,119,448 A | 9/2000 | Emmerling et al. | |
| 6,301,879 B1 * | 10/2001 | Weisweiler et al. | ........... 60/274 |
| 6,387,336 B2 * | 5/2002 | Marko et al. | ................. 423/212 |
| 6,519,935 B2 | 2/2003 | Weigl | |
| 6,935,103 B2 * | 8/2005 | Binder et al. | ................. 60/286 |
| 7,017,335 B2 | 3/2006 | Huber et al. | |
| 7,065,958 B2 | 6/2006 | Funk et al. | |
| 7,181,337 B2 | 2/2007 | Kosaka | |
| 2004/0045284 A1 | 3/2004 | Ripper et al. | |
| 2007/0079599 A1 | 4/2007 | Osaku et al. | |
| 2007/0180816 A1 | 8/2007 | Masuda et al. | |
| 2007/0204677 A1 | 9/2007 | Nishina et al. | |
| 2007/0209428 A1 | 9/2007 | Nishina et al. | |

FOREIGN PATENT DOCUMENTS

| | | |
|---|---|---|
| DE | 199 35 920 | 3/2001 |
| DE | 101 56 714 | 11/2001 |
| JP | 04-282433 | 10/1992 |
| JP | H05-222923 | 8/1993 |
| JP | H09-096212 | 4/1997 |

(Continued)

*Primary Examiner*—Thomas E Denion
*Assistant Examiner*—Diem Tran
(74) *Attorney, Agent, or Firm*—McDermott Will & Emery LLP

(57) ABSTRACT

The present invention is directed to defrost a reducing agent with cooling water of an engine and to prevent water scale from being deposited and accumulated on a cooling water pipe for circulating the cooling water. A frozen reducing agent is defrosted by being heated with cooling water of an engine. A cooling water pipe for guiding the cooling water to a reducing agent tank is provided with a cutoff valve. To defrost the reducing agent, the cutoff valve is opened. Even in the case where the reducing agent is not frozen, the cutoff valve is opened for a predetermined period after start of the cutoff valve to circulate the cooling water in the cooling water pipe.

9 Claims, 4 Drawing Sheets

FOREIGN PATENT DOCUMENTS

| | | |
|---|---|---|
| JP | 11-270329 | 10/1999 |
| JP | 2000-027627 | 1/2000 |
| JP | 2002-027627 | 1/2000 |
| JP | 2001-020724 | 1/2001 |
| JP | 2002-508466 | 3/2002 |
| JP | 2002-155732 | 5/2002 |
| JP | 2002-513109 | 5/2002 |
| JP | 2002-527660 | 8/2002 |
| JP | 2002-370016 | 12/2002 |
| JP | 2003-269145 | 9/2003 |
| JP | 2003-328744 | 11/2003 |
| JP | 2004-510151 | 4/2004 |
| JP | 2004-517336 | 6/2004 |
| JP | 2004-194028 | 7/2004 |
| JP | 2005-030888 | 2/2005 |
| JP | 2005-083223 | 3/2005 |
| JP | 2005-127262 | 5/2005 |
| JP | 2005-133541 | 5/2005 |
| JP | 2005-133695 | 5/2005 |
| WO | WO 99/30810 | 6/1999 |
| WO | WO 99/55445 | 11/1999 |
| WO | WO 00/21881 | 4/2000 |
| WO | WO 02/27280 | 4/2002 |
| WO | WO 02/057603 | 7/2002 |
| WO | WO 03/016687 | 2/2003 |
| WO | WO 03/018177 | 3/2003 |
| WO | WO 2005/024194 | 3/2005 |
| WO | WO 2005/028826 | 3/2005 |
| WO | WO 2005/040567 | 5/2005 |
| WO | WO 2005/042936 | 5/2005 |

* cited by examiner

EXHAUST EMISSION PURIFYING APPARATUS FOR ENGINE

This application is a continuation of PCT/JP2005/17287, filed on Sep. 20, 2005.

BACKGROUND OF THE INVENTION

1. Field of the Invention

The present invention relates to an exhaust emission purifying apparatus for an engine. More particularly, in such one having a given configuration such that a reducing agent to be added to an exhaust gas in the exhaust emission in order to reduce nitrogen oxides, is stored in a solution state in a reducing agent tank, the invention relates to a technique of heating the reducing agent in the reducing agent tank with cooling water of an engine to prevent the reducing agent from being frozen or to defrost the frozen reducing agent, and also relates to a technique of preventing the cooling water from residing in a cooling water pipe for leading the cooling water to the reducing agent tank so that water scale is not deposited on the pipe wall.

2. Description of the Related Art

As an apparatus for purifying nitrogen oxides (hereinbelow, called "$NO_x$") out of hazardous components emitted from an on-vehicle engine by post treatment, a following exhaust emission purifying apparatus is known. In the exhaust emission purifying apparatus, a reduction catalyst is disposed in an engine exhaust passage. A reducing agent is injected into the exhaust passage on the upstream side of the reduction catalyst, thereby causing an occurrence of a reaction between $NO_x$ in emissions and the reducing agent on the reduction catalyst, so that $NO_x$ is converted to harmless gas. The reducing agent is stored in a solution state in a reducing agent tank, and a necessary amount of the reducing agent is injected by a reducing agent injection nozzle. In a reducing process, ammonia having high reactivity with $NO_x$ is employed. As the reducing agent, a urea solution, an ammonia solution, or other liquid reducing agents that easily generate ammonia by hydrolysis can be used (Japanese Unexamined Patent Publication No. 2000-027627).

However, the exhaust emission purifying apparatus storing a reducing agent in a solution state has the following problem. In the case of using a vehicle in a cold area, the reducing agent is frozen in the reducing agent tank. Until the reducing agent is completely defrosted, smooth injection of the reducing agent cannot be performed. For example, in the case of employing a urea solution as the reducing agent, when a vehicle is used in a cold area where the temperature is −11° C. or less, the urea solution may be frozen. To solve the problem, a method is considered in which engine cooling water is employed as a heating medium, and the reducing agent in the reducing agent tank is heated with the cooling water, thereby preventing the reducing agent from being frozen or thereby defrosting the frozen reducing agent.

According to the method, however, when the apprehension of freezing of the reducing agent is dispelled or when the frozen reducing agent is defrosted, the heating operation with the cooling water is stopped. Consequently, when the heating is not performed for a long time in a case such that the vehicle is moved out from the cold area, there is the possibility that the cooling water remains in the pipe and water scale accumulates on the pipe wall.

SUMMARY OF THE INVENTION

Therefore, it is an object of the present invention to prevent a reducing agent from being frozen or to defrost a frozen reducing agent by employing cooling water of an engine as a heating medium, and also to prevent water scale from being accumulated, due to residence of the cooling water, on a cooling water pipe for leading the cooling water to a reducing agent tank.

According to one aspect of the present invention, an exhaust emission purifying apparatus for an engine for reductively purifying $NO_x$ in exhaust gas of the engine is provided. The apparatus according to the present invention is configured to include: a reduction catalyst which accelerates reduction of $NO_x$; a reducing agent tank which stores a $NO_x$ reducing agent in a solution state; a reducing agent injection nozzle which is disposed upstream of the reduction catalyst in a flow of the exhaust gas; a supplying device which supplies the reducing agent stored in the reducing agent tank to the reducing agent injection nozzle; and a heating device which heats the reducing agent in the reducing agent tank by using cooling water of the engine, as a heating medium,. The heating device includes a cooling water pipe for leading the cooling water to the reducing agent tank. There are further provided: a cutoff valve which interrupts the cooling water circulating through the cooling water pipe; and a controller which controls opening or closing of the cutoff valve, and with the controller, the cutoff valve is made to be open for a predetermined period after start of the engine.

According to the present invention, by heating a reducing agent in a reducing agent tank by a heating device using cooling water of an engine, as a heating medium, the reducing agent can be prevented from being frozen or the frozen reducing agent can be defrosted. Further, by opening the cutoff valve for a predetermined period after start of the engine, the cooling water can be periodically circulated in the cooling water pipe and accumulation of water scale can be prevented.

The other objects and features of the present invention will become apparent from the following description with reference to the accompanying drawings.

The present application claims priority from Japanese Patent Application No. 2004-316046, the entire content of which is incorporated herein by reference.

DESCRIPTION OF THE PREFERRED EMBODIMENTS

An embodiment of the present invention will be described hereinbelow with reference to the drawings.

Figure 1:
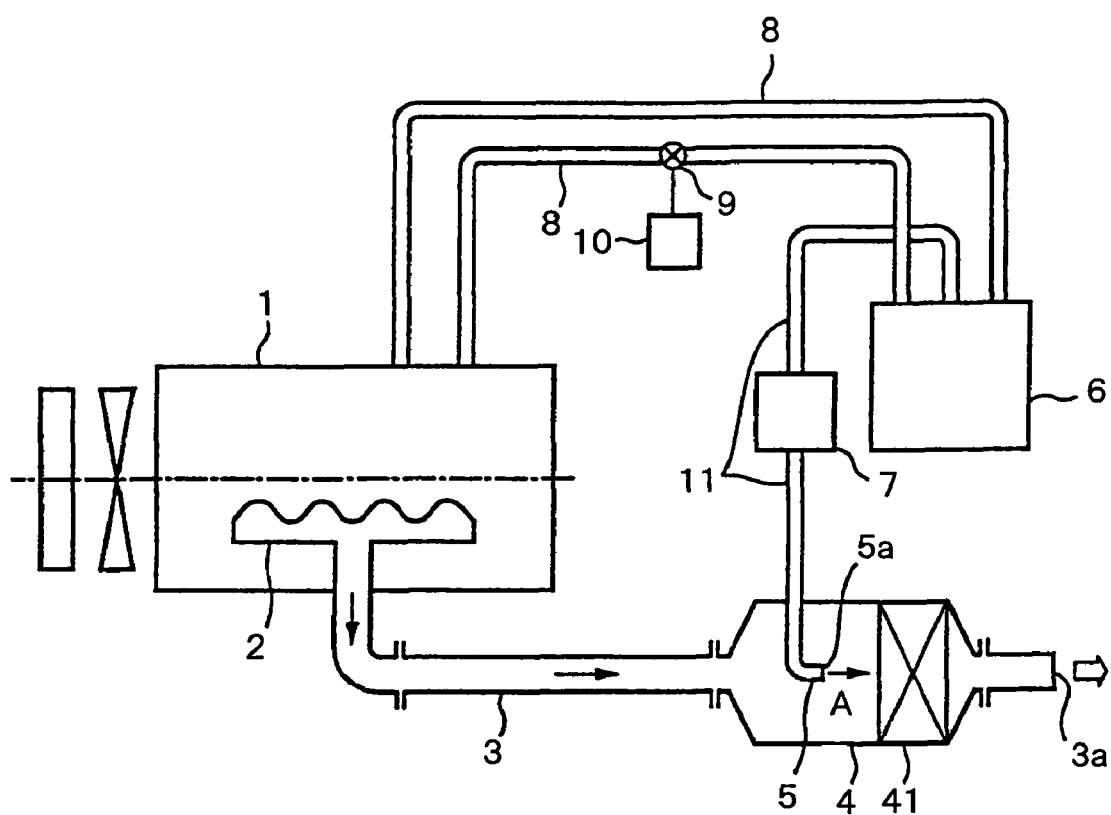
FIG. 1 is a diagram showing the configuration of an exhaust emission purifying apparatus for an engine according to an embodiment of the invention.

FIG. 1 shows the configuration of an exhaust emission purifying apparatus for an engine according to one embodiment of the invention. The exhaust emission purifying apparatus reduces $NO_x$ exhausted from an on-vehicle engine 1 (concretely, diesel engine, simply called "engine" hereinbelow) in post treatment. An exhaust pipe 3 is connected to an exhaust manifold 2 of the engine 1, and the exhaust gas of the engine 1 is released to the atmosphere via the exhaust manifold 2 and the exhaust pipe 3.

A catalyst container 4 is interposed in the exhaust pipe 3 near a discharge port 3a, and a reduction catalyst 41 is housed in the catalyst container 4. The reduction catalyst 41 is a monolithic-type catalyst formed by making zeolite-based active ingredients carried on a honeycomb integral molding carrier made of cordierite as ceramic or Fe—Cr—Al-based heat-resisting steel. The active ingredients carried by the carrier receive supply of a reducing agent and transform $NO_x$ in emissions to harmless gas.

The exhaust pipe 3 is also provided with a reducing agent injection nozzle 5 on the upstream of the reduction catalyst 41. The reducing agent injection nozzle 5 penetrates the circumferential wall (upper wall in the embodiment) of the catalyst container 4 and is fixed to the catalyst container 4. The reducing agent injection nozzle 5 injects a reducing agent (urea solution) supplied from a reducing agent tank 6 into the catalyst container 4. The tip of the reducing agent injection nozzle 5 is bent so that an end face 5a faces the front of the reduction catalyst 41. The reducing agent injection nozzle 5 injects the reducing agent to the reduction catalyst 41 in the direction of the arrow A.

The reducing agent tank 6 and the reducing agent injection nozzle 5 are connected to each other via a reducing agent supply pipe 11. A supplying device 7 is interposed in the reducing agent supply pipe 11. The supplying device 7 pumps up the reducing agent from the reducing agent tank 6 by a pump (13) and supplies the reducing agent to the reducing agent injection nozzle 5.

Figure 2:
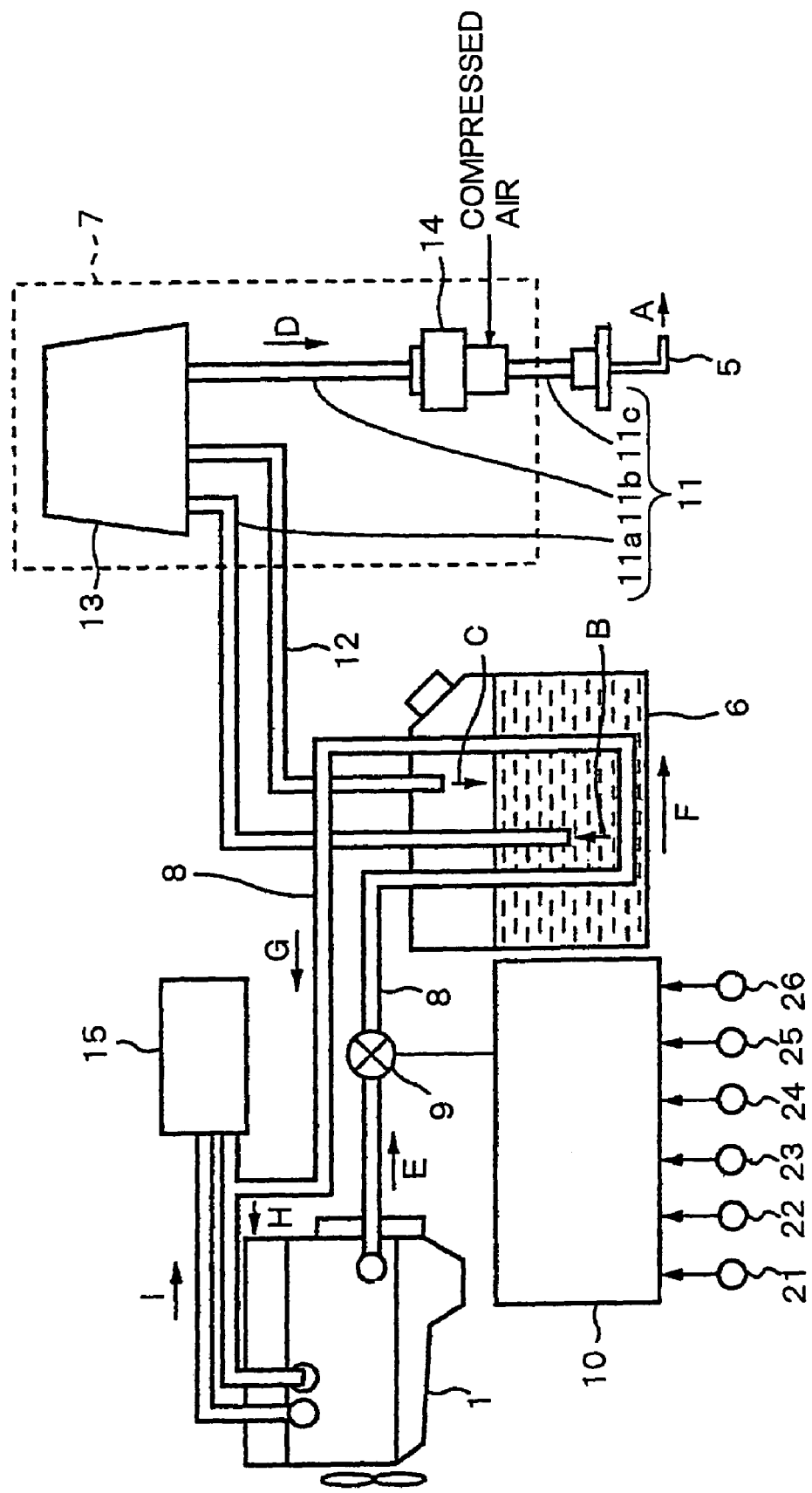
FIG. 2 is a diagram showing the configuration of main components of the exhaust emission purifying apparatus.

FIG. 2 shows the details of the configuration of the exhaust emission purifying apparatus (except for the reduction catalyst 41) according to the embodiment.

The reducing agent supply pipe 11 is constructed by a first supply pipe 11a connecting the reducing agent tank 6 and a pump 13 of the supplying device 7, a second supply pipe 11b connecting the pump 13 and a dosing unit 14 in the supplying device 7, and a third supply pipe 11c connecting the dosing unit 14 and the reducing agent injection nozzle 5. The pump 13 pumps up the reducing agent in the reducing agent tank 6 (arrow B), transmits the reducing agent to the dosing unit 14 (arrow D), and returns an excessive amount to the reducing agent tank 6 through a reducing agent return pipe 12 (arrow C). The dosing unit 14 mixes the reducing agent transmitted from the pump 13 with compressed air and supplies the mixture to the reducing agent injection nozzle 5.

In the embodiment, a cooling water pipe 8 for leading a flow of cooling water of the engine 1 to the reducing agent tank 6 is provided. The cooling water pipe 8 is branched from a water jacket formed in the engine 1, passes through the inside of the reducing agent tank 6, and is connected to another cooling water pipe for circulating the cooling water between the water jacket and a cooling water tank 15. The cooling water heated by the engine I is circulated through the cooling water pipe 8. The heat of the cooling water is transmitted to the reducing agent via the wall of the cooling water pipe 8, so that the reducing agent is prevented from being frozen or the frozen reducing agent is defrosted. In FIG. 2, the flows of the cooling water are shown by arrows E, F, G, and H.

A cutoff valve 9 is interposed in the cooling water pipe 8. By closing the cutoff valve 9, the cooling water circulated through the cooling water pipe 8 is interrupted, and the circulation of the cooling water is stopped. In the embodiment, an electromagnetic valve is employed as the cutoff valve 9.

A controller 10 is connected to the cutoff valve 9, and opening or closing of the cutoff valve 9 is controlled by the controller 10. The controller 10 includes a microcomputer as a CPU. To the controller 10, detection signals of various sensors are input, such as an engine start sensor 21 for detecting an on/off state of a power switch (ignition switch in the embodiment) of the engine 1, a first temperature sensor 22 for detecting an ambient temperature, a second temperature sensor 23 for detecting a temperature of the supplying device 7 (the inside of the pump 13 in the embodiment), a third temperature sensor 24 for detecting a temperature in the inside of the reducing agent tank 6, an engine speed sensor 25 for detecting a rotating speed of the engine 1, and a fourth temperature sensor 26 for detecting a temperature of the cooling water of the engine 1. In the embodiment, the temperature of intake air is employed as the ambient temperature.

On the basis of the input detection signals, the controller 10 detects start of the engine 1, opens the cutoff valve 9, and makes the cooling water circulate in the cooling water pipe 8. In the embodiment, when at least any one of the following condition is not satisfied, the cutoff valve 9 is opened for a predetermined period to circulate the cooling water to prevent water scale from being accumulated. The conditions are: (a) the power switch of the engine 1 is turned on, (b) the ambient temperature is equal to or less than a predetermined temperature, (c) the temperature of the supplying device 7 is equal to or less than a predetermined temperature, (d) the temperature within the reducing agent tank 6 is equal to or less than a predetermined temperature, and (e) the rotating speed of the engine 1 is equal to or higher than a predetermined value. On the other hand, when all of the conditions (a) to (e) are satisfied, the controller 10 opens the cutoff valve 9 to circulate the cooling water and shifts to the control for preventing the reducing agent in the reducing agent tank 6 from being frozen or for defrosting the frozen reducing agent.

The operation of the controller 10 of the exhaust emission purifying apparatus according to the embodiment will be described hereinbelow with reference to the flowchart. The controller 10 executes a control routine shown in the flowchart every predetermined time.

Figure 3:
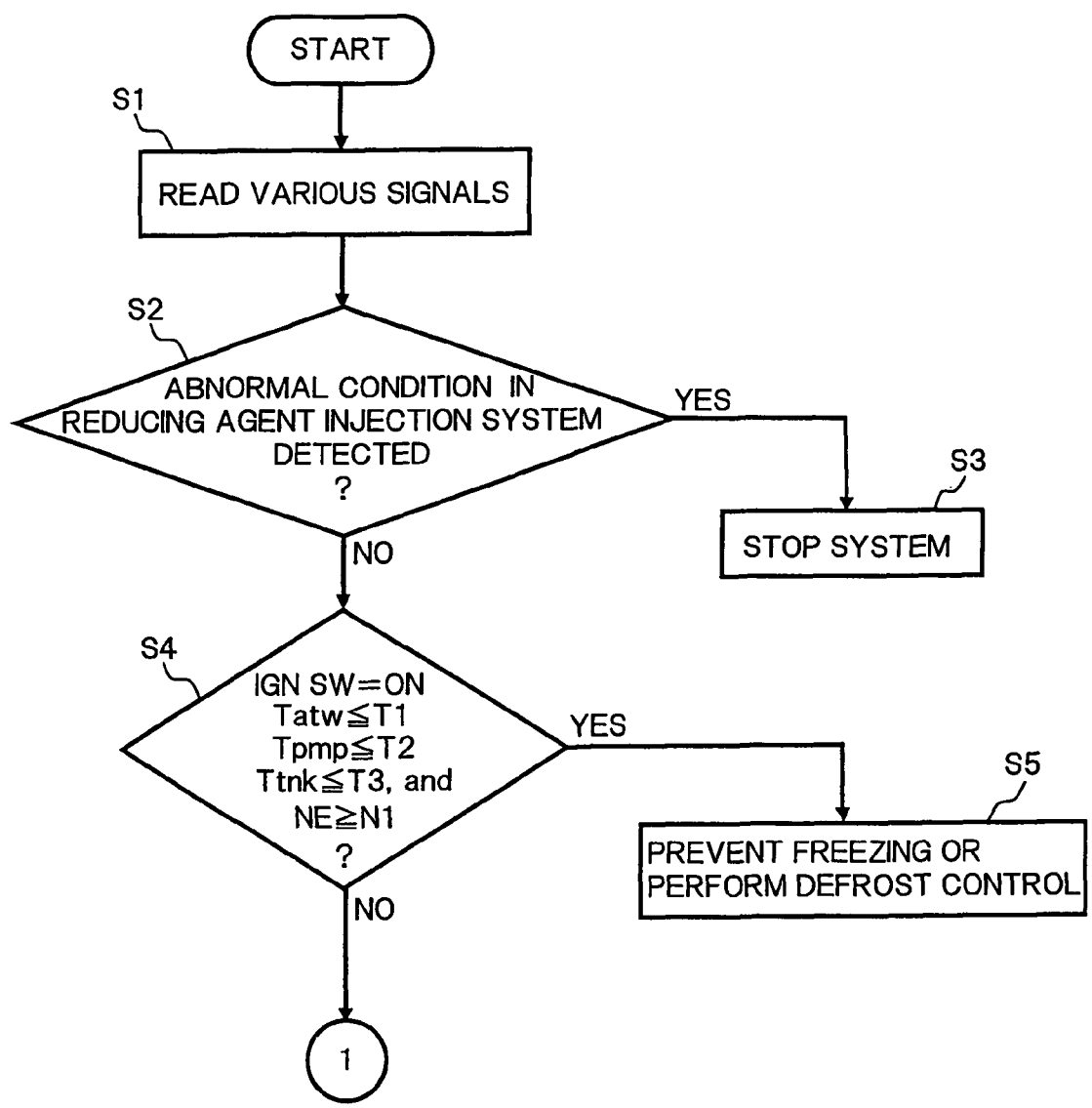
FIG. 3 is a flowchart showing the first half procedure of a controller according an embodiment.

In step S1 of the flowchart of FIG. 3, the controller 10 reads a power switch signal detected by the engine start sensor 21, an ambient temperature Tatm detected by the first temperature sensor 22, a temperature in the pump Tpmp detected by the second temperature sensor 23, a temperature within the tank Ttnk detected by the third temperature sensor 24, an engine speed NE detected by the engine speed sensor 25, a cooling water temperature Twtr detected by the fourth temperature sensor 26, and the like.

In step S2, whether or not an abnormal condition occurs in a reducing agent addition system including the supplying device 7 and a not-shown engine control unit is determined. When the abnormal condition occurs, the process advances to step S3 where the operation of the reducing agent addition system is stopped. In the other case, the process advances to step S4. The abnormal condition in the system detected in step S2 includes a failure of the reducing agent addition system due to clogging (precipitation of urea) in the reducing agent injection nozzle 5, a state where the concentration of the reducing agent is out of a proper range, and a state where the remaining amount of the reducing agent in the reducing agent tank 6 is less than a predetermined amount.

Figure 4:
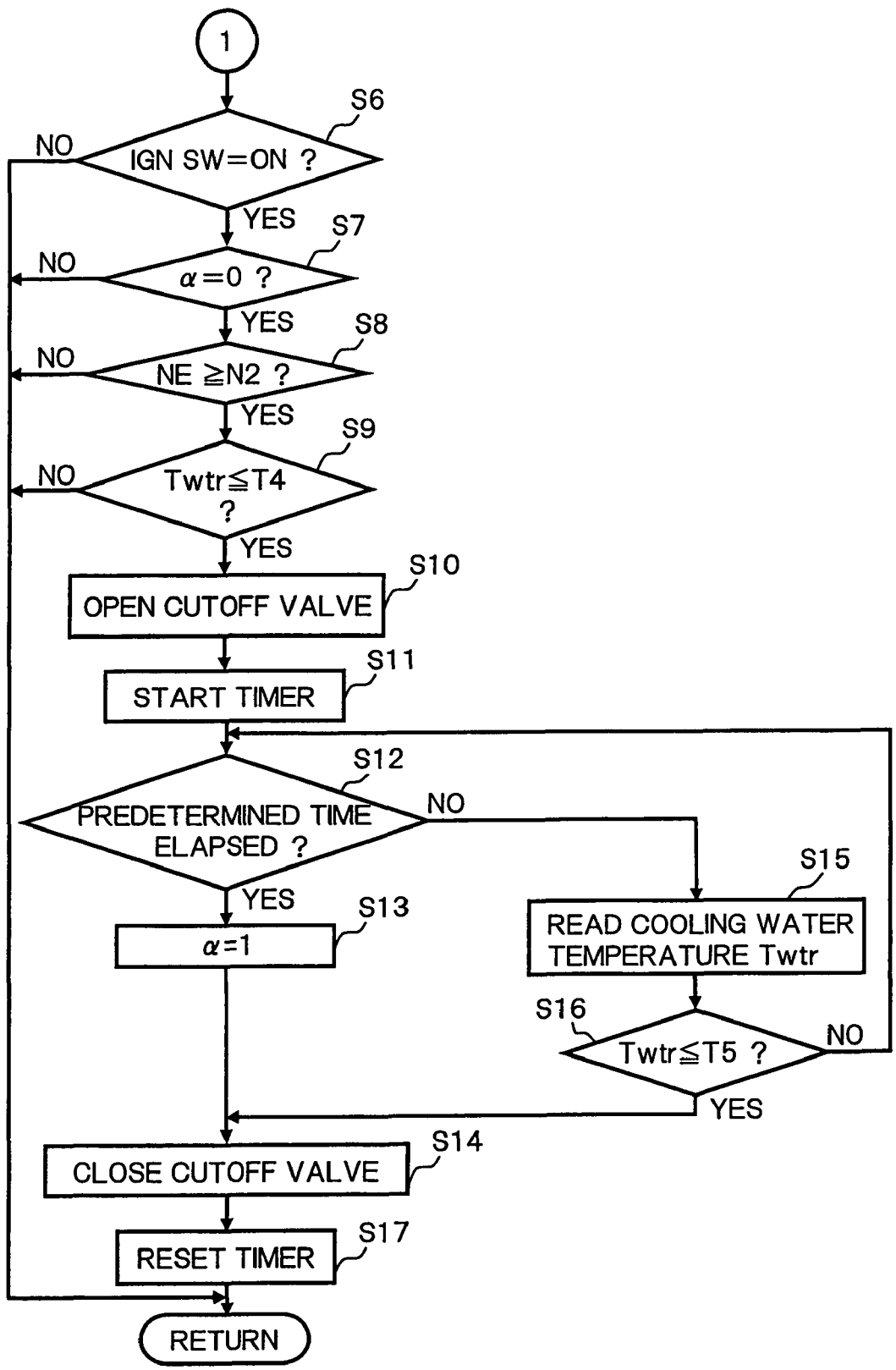
FIG. 4 is a flowchart showing the latter half procedure of the controller.

In step S4, the present operating state is determined on the basis of the input detection signals. When all of the conditions are satisfied, which are (a) the power switch signal indicates the on-state of the power switch, (b) the ambient temperature Tatm is equal to or less than a predetermined temperature T1, (c) the temperature in the pump Tpmp is equal to or less than a predetermined temperature T2, (d) the temperature within the tank Ttnk is equal to or less than a predetermined temperature T3, and (e) the engine speed NE is equal to or higher than a predetermined value N1, it is determined that the engine 1 has started and the possibility that the reducing agent in the reducing agent tank 6 is frozen is high, and the process advances to step S5. On the other hand, when any one of the conditions (a) to (e) is not satisfied, the process advances to the step S6 in the flowchart shown in FIG. 4.

In step S5, the cutoff valve 9 is opened to circulate the cooling water heated by the engine 1, thereby preventing the reducing agent in the reducing agent tank 6 from being frozen or defrosting the reducing agent that has frozen. The control is continued until the temperature of the reducing agent rises and the apprehension of freezing of the reducing agent is dispelled or the frozen reducing agent is defrosted. On the basis of the temperature within the tank Ttnk, the end timing of the control can be determined.

In step S6, whether the power switch of the engine 1 is turned on or not is determined. When the power switch is turned on, the process advances to step S7, and in the other case, the routine is returned.

In step S7, whether the value of a cutoff valve operation flag α is zero or not is determined. The flag α is initialized each time the engine 1 starts and is set to zero. By opening the cutoff valve 9 after start, the flag α is set to 1. When α=0, the process advances to step S8, and in the other case, the routine is returned. At the time of performing the process in this step, the cutoff valve 9 is closed.

In step S8, whether the engine speed NE is equal to or higher than a predetermined value N2 (in this case where N1=N2) or not is determined. If NE is equal to or higher than N2, the process advances to step S9, and in the other case, the routine is returned.

In step S9, whether the cooling water temperature Twtr is equal to or lower than a predetermined temperature T4 or not is determined. If Twtr is equal to or lower than T4, the process advances to step S10, and in the other case, the routine is returned. The predetermined temperature T4 corresponds to "second temperature" of the invention, and is set to 55° C., for example.

In step S10, the cutoff valve 9 is opened to circulate the cooling water.

In step S11, the timer is started, and time elapsed after the cutoff valve 9 is opened is measured.

In step S12, whether the time measured by the timer has reached a predetermined time or not is determined. If the measured time has reached, the process advances to step S13, and if not reached, the process advances to step S15. The predetermined time is set to, for example, five minutes.

In step S13, the value of the cutoff valve operation flag α is set to 1 so as to indicate the cutoff valve 9 is opened once after start of the engine 1.

In step S14, the cutoff valve 9 is closed to stop the circulation of the cooling water.

On the other hand, when it is determined in step S12 that the predetermined time has not elapsed after opening of the cutoff valve 9, the cooling water temperature Twtr is read (S15) and whether the read temperature Twtr is equal to or higher than a predetermined temperature T5 or not is determined (S16). When Twtr is equal to or higher than T5, the process advances to step S14 where the cutoff valve 9 is forcibly closed. In the other case, the process returns to step S12 and the open state of the cutoff valve 6 is maintained. Until the predetermined time elapses, the processes in steps S12, S15, and S16 are repeated. The predetermined temperature T5 corresponds to "first temperature" of the invention. To prevent ammonia gas from being generated when the urea solution is heated by high-temperature cooling water, for example, the predetermined temperature T5 is set to 65° C.

In step S17, the timer is reset.

There is the case where a gas-liquid separation tank is employed as means for removing bubbles entered in a water tank 15 at the time of changing the cooling water. The gas-liquid separation tank can be easily interposed in the cooling water pipe 8.

In the embodiment, the exhaust emission purifying apparatus of the engine 1 is configured to include the reduction catalyst 41, the reducing agent tank 6, the reducing agent injection nozzle 5, the supplying device 7, the cooling water pipe 8, the cutoff valve 9, and the controller 10.

In the embodiment, the following effects can be achieved.

First, at the time of starting the engine 1, the cooling water in the engine 1 is led to the reducing agent tank 6 through the cooling water pipe 8. By heating the reducing agent in the reducing agent tank 6 with the cooling water as a heating medium, the reducing agent can be prevented from being frozen or the frozen reducing agent can be defrosted. Even in the case where it is unnecessary to prevent freezing or to perform defrosting, by opening the cutoff valve 9 for a predetermined period after start of the engine 1, the cooling water is periodically circulated in the cooling water pipe 8, and accumulation of water scale can be prevented.

Second, only when all of the conditions are satisfied, which are (a) the power switch of the engine 1 is turned on, (b) the ambient temperature Tatm is equal to or less than the predetermined temperature T1, (c) the temperature Tpmp of the supplying device 7 is equal to or less than the predetermined temperature T2, (d) the temperature within the reducing agent tank 6 Ttnk is equal to or less than the predetermined temperature T3, and (e) the engine speed NE of the engine 1 is equal to or higher than the predetermined value N1, the controller 10 shifts to the control for preventing freezing or for defrosting, so that the possibility of freezing is accurately determined and the control can be executed.

Third, by forcibly closing the cutoff valve 9 when the temperature of the cooling water Twtr reaches the predetermined temperature T5 within the predetermined time after opening of the cutoff valve 9, the generation of ammonia gas in the reducing agent tank 6 can be avoided.

As a reducing agent of the present invention, except for a urea solution employed in the above description, other preferable liquid reducing agents for purifying exhaust gas, such as an ammonia solution, can be employed.

The present invention can be applied not only to a diesel engine, but can be applied to a gasoline engine.

Although the present invention has been described above by the preferred embodiment, the scope of the invention is not limited to the description but is determined according to applied provisions on the basis of the description of the scope of the claims.

We claim:

1. An exhaust emission purifying apparatus for an engine, for reductively purifying $NO_x$ in exhaust gas of the engine, comprising:

a reduction catalyst for accelerating reduction of $NO_x$;

a reducing agent tank for storing an $NO_x$ reducing agent in a solution state;

a reducing agent injection nozzle disposed upstream of the reduction catalyst in a flow of the exhaust gas;

a supplying device for supplying the reducing agent stored in the reducing agent tank to the reducing agent injection nozzle;

a heating device for heating the reducing agent in the reducing agent tank, the heating device including a cooling water pipe for leading cooling water of the engine to the reducing agent tank and using, as a heating medium, the cooling water flowing in the cooling water pipe;

a cutoff valve for interrupting the cooling water circulating through the cooling water pipe; and a controller for controlling opening or closing of the cutoff valve, wherein the controller is configured to open the cutoff valve to circulate the cooling water through the cooling water pipe for a predetermined period after start of the engine each time the engine starts.

2. An exhaust emission purifying apparatus for an engine, according to claim 1, wherein the controller is configured to conduct a state determination relative to freezing of the reducing agent in the reducing agent tank, under a first determination which corresponds to one state that the reducing agent has been frozen or there is a possibility that the reducing agent is frozen, open the cutoff valve for a first period determined in accordance with a temperature within the reducing agent tank and, under a second determination which corresponds to the state other than the afore-said one state, open the cutoff valve for a predetermined second period.

3. An exhaust emission purifying apparatus for an engine, according to claim 2, wherein under the second determination, when a temperature of the cooling water reaches a predetermined first temperature higher than a temperature at the time of opening of the cutoff valve before lapse of the second period, the controller forcibly closes the cutoff valve.

4. An exhaust emission purifying apparatus for an engine, according to claim 3, wherein under the second determination, when the temperature of the cooling water is equal to or higher than a predetermined second temperature lower than the first temperature, the controller inhibits opening of the cutoff valve.

5. An exhaust emission purifying apparatus for an engine, according to any one of claims 2 to 4, further comprising a temperature sensor disposed in the reducing agent tank, the temperature sensor for detecting a temperature in the inside of the reducing agent tank.

6. An exhaust emission purifying apparatus for an engine, according to claim 1, wherein the controller is configured to open the cutoff valve for a predetermined second period when at least one of a plurality of conditions is not satisfied, the plurality of conditions being: (a) a power switch of the engine is turned on, (b) an ambient temperature is equal to or less than a predetermined temperature, (c) a temperature of the supplying device is equal to or less than a predetermined temperature, (d) a temperature within the reducing agent tank is equal to or less than a predetermined temperature, and (e) an engine speed is equal to or higher than a predetermined value, and wherein the controller is configured to open the cutoff valve for a first period to prevent the reducing agent in the reducing agent tank from being frozen or to defrost the frozen reducing agent when all of conditions (a) to (e) are satisfied.

7. An exhaust emission purifying apparatus for an engine, according to claim 6, wherein, after opening of the cutoff valve, when a temperature of the cooling water reaches a predetermined temperature before lapse of the predetermined second period, the controller forcibly closes the cutoff valve.

8. An exhaust emission purifying apparatus for an engine, according to claim 6, further comprising a temperature sensor for detecting a temperature inside the reducing agent tank, wherein the controller is configured to determine the end of the first period based on the temperature detected by the temperature sensor.

9. An exhaust emission purifying apparatus for an engine, for reductively purifying $NO_x$ in exhaust gas of the engine, comprising:

a reduction catalyst for accelerating reduction of $NO_x$;

a reducing agent tank for storing an $NO_x$ reducing agent in a solution state;

a reducing agent injection nozzle for injecting the reducing agent stored in the reducing agent tank into an exhaust passage on the upstream side of the reduction catalyst;

a heating device for heating the reducing agent in the reducing agent tank, the heating device including a cooling water pipe for leading cooling water of the engine to the reducing agent tank and using, as a heating medium, the cooling water flowing in the cooling water pipe;

a cutoff valve for interrupting the cooling water circulating through the cooling water pipe; and a controller for controlling opening or closing of the cutoff valve, wherein the controller is configured to open the cutoff valve for a predetermined period each time the engine starts.

* * * * *